United States Patent [19]

Dienemann et al.

[11] 4,241,587
[45] Dec. 30, 1980

[54] REFRIGERATING APPARATUS, ESPECIALLY REFRIGERATOR OR FREEZER

[75] Inventors: Wolfgang Dienemann; Rudolf Reichert, both of Giengen, Fed. Rep. of Germany

[73] Assignee: Bosch-Siemens Hausgeräte GmbH, Stuttgart, Fed. Rep. of Germany

[21] Appl. No.: 965,781

[22] Filed: Dec. 4, 1978

[30] Foreign Application Priority Data

Dec. 2, 1977 [DE] Fed. Rep. of Germany ....... 2753744

[51] Int. Cl.³ .............................................. F25D 21/06
[52] U.S. Cl. .......................................... 62/80; 62/158; 62/234
[58] Field of Search ....................... 62/80–82, 62/155, 276, 234, 158

[56] References Cited

U.S. PATENT DOCUMENTS 3,022,640  2/1962  Hubacker ...................... 62/276 X Primary Examiner—William E. Wayner
Attorney, Agent, or Firm—Herbert L. Lerner

[57] ABSTRACT

Apparatus and method for storing material at and below a permissible upper temperature below the freezing point in a refrigeration chamber containing a heat exchanger and a thermostat to activate a refrigeration to supply coolant to the heat exchanger to maintain a set temperature. Periodically defrosting the heat exchanger by introducing heat, usually by an electric heating element in the refrigeration chamber, but prior to initiating defrosting, the thermostat is taken out of control of the refrigeration unit and the latter automatically activated to effect a drop in temperature in the chamber sufficient to prevent the stored material from exceeding it permissible upper temperature during subsequent defrosting.

3 Claims, 3 Drawing Figures

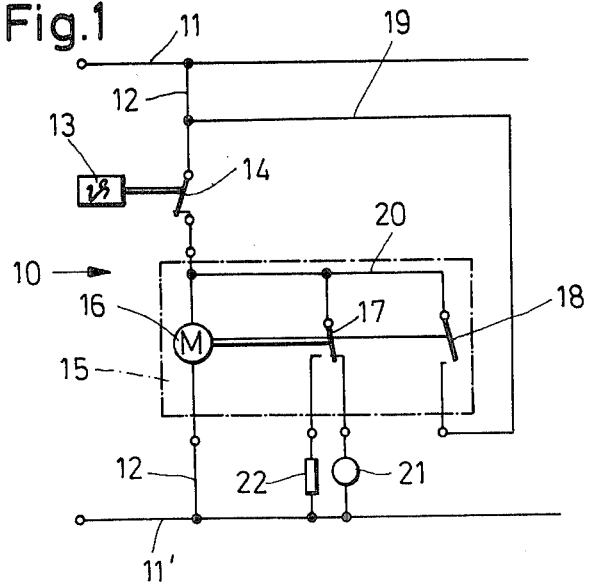
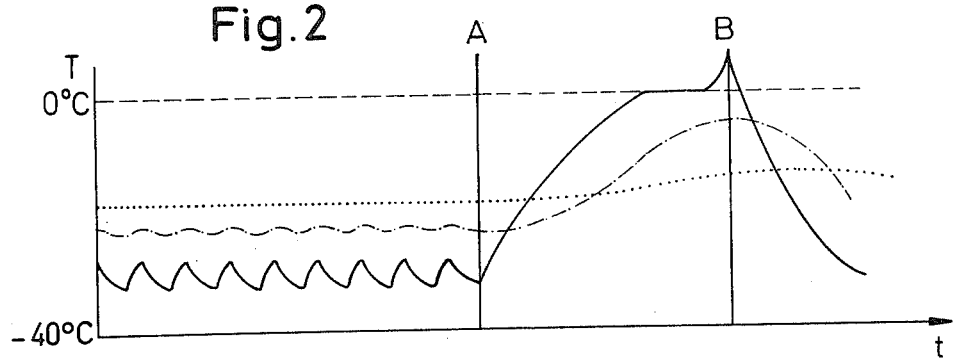
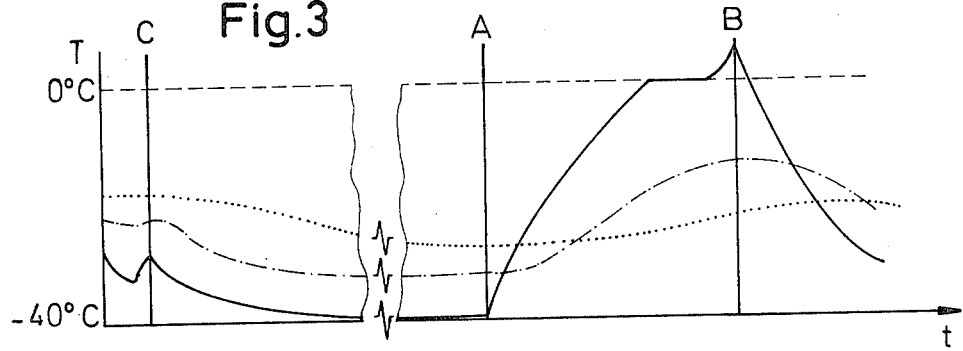

REFRIGERATING APPARATUS, ESPECIALLY REFRIGERATOR OR FREEZER

BACKGROUND OF THE INVENTION

1. Field of the Invention

This invention relates to refrigerators and freezers and more particularly refers to new and improved apparatus and method for defrosting the heat exchanger in the refrigeration chamber without exceeding the set temperature of stored material.

2. Description of the Prior Art

Refrigerating apparatus, especially a refrigerator, a freezer or the like with at least one refrigeration chamber, the set temperature of which is maintained by an electrically operated refrigerating unit controlled by a thermostat is known. A defrosting device for defrosting the heat exchanger or evaporator on the cold side can be controlled by an organ or control device, for instance, a timer, which controls the defrosting process via switching devices and associated bypass lines.

In refrigeration equipment the evaporator which serves as the heat exchanger on the cold side between the normal cooling cycles, has been defrosted at will and also automatically. In the case of automatic defrosting it is customary to control the defrosting process either dependent on the number of door openings during the operation of the refrigerating equipment or dependent on the thickness of the frost formation at the evaporator, but perhaps foremost, also dependent on time by means of a timing device. If a time-dependent control device is used, the defrosting process is controlled at fixed time intervals or periods of time dependent on the running time of the refrigeration unit.

The defrosting itself is accomplished in such known refrigerating equipment by natural incidence of heat from the outside and by supplying additional thermal energy, which is supplied either by electric heating elements such as heater resistors, heater lamps or the like, or also by reversing the refrigerant circulation in a so-called hot-gas thawing process. While the refrigeration unit is shut down during the defrosting process if electric heating energy is supplied during the thawing, it must continue to run if the evaporator is defrosted by means of hot gas, in order to supply thereby the thermal energy required for the defrosting process.

Among the many known devices and proposals for defrosting the evaporator of such refrigerating equipments, one proposal has become known, in particular, in connection with hot-gas defrosting, according to which each defrosting is to be preceded by a normal cooling cycle of the refrigeration unit. Due to the heating of the compressor, enough thermal energy is supposed to be available when the defrosting process is initiated, that the defrosting process is accelerated and an excessive temperature rise in the cold chamber is avoided. The run of the compressor which is switched on automatically, according to this proposal, prior to the defrosting however, is only one of the normal cooling cycles, which ends in the normal manner when the lower switching point of the controller is reached. The emphasis is therefore on the problem to make enough thermal energy available for the defrosting process by correspondingly heating up the compressor and the casing of the unit.

Even though the known defrosting devices work satisfactorily and reliably in customary refrigerating equipment, the operating temperature of which is generally above the freezing point, it is not directly possible to apply defrosting devices of refrigerating equipments to freezing apparatus, as in the latter, the operating temperature is far below the freezing point. The reason for this is that the danger exists here, especially because of the large temperature gradient between the evaporator to be defrosted and the freezing chamber, that the temperature in the freezing chamber rises above the permissible temperature limit because of the thermal energy supplied during the thawing process. For this reason it is not possible in freezers to equip them with the ususal defrosting devices and to stay at the same time with certainty within the requirements set for determining the quality and performance class of the freezing equipment, especially the permissible upper temperature limit for the refrigerated matter. This, however, is particularly important for the preservation and quality of the matter to be refrigerated, since an undue temperature rise during the defrosting process must be avoided at all costs in order to prevent permanent damage to the material. This circumstance must therefore be considered as the essential reason why defrosting devices are used in freezers only in rare cases.

One is therefore compelled to perform the defrosting, which is necessary in these freezers at least from time to time for them to function properly in a rather laborious manner. The recommendation given is to remove the refrigerated material from the freezer during the defrosting process and to keep it in a heat-insulating enclosure, for instance, wrapped in several layers of newsprint, and to store it in the equipment only when the defrosting is completed. In view of the effort connected with this cumbersome procedure and the warming up of the refrigerated matter which cannot be avoided in spite of great care, omitting such a defrosting device in freezers due to the difficulties mentioned means a particularly great shortcoming.

Nevertheless, in order to make regular defrosting possible also in freezers without having to tolerate a temperature rise beyond the permissible limit in the freezing chamber detrimental to the refrigerated matter, the evaporators equipped with an automatic defrosting device are arranged in known freezers outside the freezing chamber. This, however, necessitates the installation of special circulating devices, by which the air cooled at the evaporators can be circulated in the freezeing chamber via a separate system of ducts. Systems of this kind, however, are connected with a large expenditure of structural and control means and are therefore relatively expensive. In addition to particularly high energy consumption, they also have the disadvantage that they make the ratio between the external dimensions and the useful space of the freezer worse, because they are accommodated outside the freezing chamber. If the external dimensions of such freezers are limited, however, this means a considerable reduction of the useful space available.

SUMMARY OF THE INVENTION

It is therefore an object of the present invention to provide apparatus and method for defrosting the heat exchanger in the refrigeration chamber which avoids in freezers of the type described at the outset the disadvantages occurring in connection with the defrosting device and makes it possible through simple measures and without special structural expenditures that the evaporator can be defrosted properly by means of a defrosting device proven in refrigerators, without any danger that during the defrosting process the temperature of the refrigerated matter stored in the equipment could rise above the permissible temperature limit.

With the foregoing and other objects in view, there is provided in accordance with the invention a refrigerating apparatus for storing material at and below a permissible upper temperature below the freezing point, such as a refrigerator, freezer and the like with at least one refrigeration chamber, having a heat exchanger disposed in the refrigeration chamber, an electrically operated refrigeration unit controlled by a thermostat in the refrigeration chamber which refrigeration unit when energized provides coolant to the heat exchanger to maintain a set temperature of desired coldness in the refrigeration chamber, means for defrosting the heat exchanger, a control device, such as a timer, including switching elements to initiate and terminate defrosting of the heat exchanger, the improvement comprising a switch-on means for automatically activating the refrigeration unit prior to every initial defrosting to effect a drop in temperature in the refrigeration chamber sufficient to prevent the stored material from exceeding its permissible upper temperature during subsequent defrosting.

In accordance with the foregoing, there is provided a method of storing material at and below a permissible upper temperature below the freezing point in a refrigeration chamber having a heat exchanger therein, maintaining a set temperature of desired coldness in the refrigeration chamber by a thermostat in the chamber which activates an electrically operated refrigeration unit to supply coolant to the heat exchanger, periodically deactivating the refrigeration unit and introducing heat into the refrigeration chamber to defrost the heat exchanger, and after defrosting returning to activating the refrigeration unit by control with the thermostat in the chamber, the improvement comprising immediately prior to initiating every defrosting, decontrolling the thermostat to prevent it from activating the refrigeration unit and automatically activating the refrigeration unit to effect a drop in temperature in the refrigeration chamber sufficient to prevent the stored material from exceeding its permissible upper temperature during subsequent defrosting.

Other features which are considered as characteristic for the invention are set forth in the appended claims.

Although the invention is illustrated and described herein as embodied in a refrigerating apparatus, especially refrigerator or freezer, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and and advantages thereof will be best understood from the following description when read in connection with the accompanying drawings, in which:

FIG. 1 is a simplified circuit diagram of a refrigerating unit equipped with an automatic defrosting device for a freezer, the defrosting of which is preceded automatically by a continuous run of the unit, FIG. 2 is a diagram showing the different temperature curves of material stored, air temperature and evaporator temperature, of a freezer equipped with an automatic defrosting device and which freezer can be defrosted in a conventional manner.

FIG. 3 is also a diagram showing the different temperature curves of a freezer equipped as in FIG. 2 but in addition provided for automatically preceding each defrosting with a continuous run of the refrigeration unit to effect a drop in temperature in the freezer chamber sufficient to prevent the stored material from exceeding a permissible upper temperature during subsequent defrosting.

DETAILED DESCRIPTION OF THE INVENTION

In accordance with the present invention, the switching organ or control device, e.g. timer, automatically switches-on the refrigerating unit prior to every defrosting process, to cause the temperature in the freezing chamber to drop sufficiently so that the refrigerated matter does not exceed the permissible upper temperature limit during the subsequent defrosting process. A particularly simple and advantageous embodiment of the invention, is equipping the switching organ with a drive which is influenced by the circuit of the refrigerating unit and is connected in series with the contacts of the thermostat during the control operation. The switching organ controls switching elements, of which one closes the circuit of the drive and that of the refrigerating unit via a bypass line shorting the thermostat when the defrosting process is initiated, and another one is designed as a double-throw switch which is connected into the circuit of the refrigerating unit and, after the temperature in the freezing space is lowered sufficiently, switches the circuit of the refrigerating unit to an element which brings about the defrosting process. After the defrosting process, the switching organ switches back to the contact of the refrigerating unit, whereupon the first switching element opens the contact in the bypass line, so that the normal control operation which is controlled by the thermostat, is continued until the next defrosting process is initiated.

An embodiment example of the subject of the invention will be explained with the aid of a circuit diagram, shown simplified in FIG. 1, and two diagrams shown in FIG. 2 and FIG. 3, in which the temperature curves of two freezers equipped with an automatic defrosting device, one in the conventional manner and the other in accordance with the invention, are juxtaposed.

In a circuit diagram 10, shown simplified in FIG. 1, two conductors of the connecting cable of a freezing equipment, not shown, which can be connected to the two poles of a power source, for instance, between the phase conductor and neutral of a standard power line, are designated with numerals 11 and 11'. Between the two conductors 11 and 11', a line 12 is connected, in which a thermostat 13 with a control switch 14 as well as various parallel-connected loads, among them a time-dependent organ 15, are connected in series. The time-dependent organ 15, which in the embodiment example shown is designed as a timer, has a drive 16, which is connected into the circuit normally controlled by the control switch 14 of the thermostat 13, for a timing mechanism. The latter actuates a double-throw switch 17 as well as a switch 18 in time relationship via suitable devices, indicated only symbolically in the drawing.

The control switch 14 of the thermostat 13 can be shorted by a by-pass line 19 which is connected at one end between the conductor 11 of the connecting wire and the control switch 14, to the connecting line 12 and ends, at the other end, to the fixed contact of the switch 18 at the timer 15. Within the timer 15 there is a line 20, the one end of which is connected to the movable contact of the switch 18, while its other end is connected, between the control switch 14 of the thermostat 13 and the drive 16 of the timer 15, to the connecting line 12. A branch of this line 20 is connected to the movable contact of the double-throw switch 17, the fixed contacts of which form the respective end points of two parallel lines, in which the drive 21 of the refrigeration compressor and a heater element 22 serving as the defroster heater for the evaporator of the refrigerating unit are disposed next to each other. Both lines, which can be controlled by the double-throw switch 17, are connected to the conductor 11' of the connecting cable.

In the circuit diagram shown, all switching members, i.e., the control switch 14 of the thermostat 13 as well as the double-throw switch 17 and the switch 18 of the timer 15 are shown in their rest position. The circuit of the drive 21 of the refrigeration compressor is then closed via the line 12, the control switch 14, the line 20 as well as the double-throw switch 17 and the corresponding line branches. The drive 16 of the timer 15 is connected parallel to the drive 21 of the refrigeration compressor behind the control switch 14 in the line 12. If the two switching elements of the timer 15 are in the position shown, the drive 21 of the refrigeration compressor is therefore switched-on, as is the drive 16 of the timer 15. The refrigerating unit therefore runs in normal control operation. The thermostat 13, which is arranged within the freezing compartment in the usual manner, opens the control switch 14 when its lower switching point is reached and thereby shuts down the two drives 16 and 21. If now the temperature in the freezing compartment rises above the upper switching point of the thermostat 13, then the control switch 14 is closed again and both drives run. In this manner, the drive 16 of the timer 15 adds the running times of the drive of the refrigerating compressor.

After a running time of the refrigerating unit, which can be predetermined in accordance with the boundary conditions and the parameters of the respective freezer, a frost or ice layer has formed on the evaporator of the former of a thickness which makes defrosting necessary. At this time, the timing mechanism in the timer 15 first causes the switch 18 to close. Closing this switch 18 shorts the control switch 14 of the thermostat 13 via the path through the line 19, so that the drive 21 of the refrigerating compressor as well as the drive 16 of the timer continue to run regardless of the position of the control switch 14. The refrigerating unit therefore runs continuously and the temperature in the freezing compartment drops far below the set temperature. After a sufficiently long time, in which normally a steady-state condition with respect to the temperature in the freezing compartment settles, the double-throw switch 17 is actuated via the timing mechanism of the timer 15. This interrupts the circuit of the drive 21 of the refrigeration compressor, but at the same time the circuit of the heater element 22 serving as the defroster heater for the evaporator is closed via the appropriate line branches. Meanwhile, the switch 18 remains in its closed position, so that the drive of the timer 16 continues to run and the circuit is closed via the heater element 22. The heater element remains switched-on until the evaporator is defrosted.

At the end of a time interval which is required for the reliable defrosting of the evaporator and is set at the timing mechanism of the timer 15, the timing mechanism switches back, the double-throw switch 17 being switched to the contact of the drive 21 of the refrigeration compressor and the switch 18 being opened simultaneously. Thereupon, the normal control operation of the refrigerating unit resumes.

In the two diagrams according to FIGS. 2 and 3, the temperature curves of two refrigeration equipments equipped with an automatic defrosting device are plotted over a section of the normal control operation and a defrosting process following thereupon. The diagram as per FIG. 2 illustrates the defrosting in the conventional manner by switching-on the defrosting heater at the end of a normal cycle, while the defrosting process according to the diagram in FIG. 3 is preceded by a continuous run of the unit. In both diagrams, the zero-degree limit is represented by a dashed horizontal straight line. The curve underneath, shown as a dotted line, on the other hand, indicates the shape of the temperature in the core of the warmest standardized test package stored in the freezer, while the dash-dotted curve below represents the air temperature measured approximately in the center of the freezer compartment. As can be seen clearly from the left half of FIG. 2, the core temperature is nearly constant at minus 18° in normal control operation, while the air temperature fluctuates about an average value of about −22° C. according to the cooling cycles which are represented by the lower sawtooth curve and appear as changes of the evaporator temperature, with a certain phase shift relative to the latter.

At the start of the defrosting process, triggered, for instance, by a timer and indicated by the vertical straight line "A", in the embodiment example according to FIG. 2, the evaporator temperature rises from the lower switching-off point of the control on and reaches rapidly with the aid of the now effective heater the dashed zero-degree limit. It remains there until it rises toward the end of the defrosting process above the zero point at "B." Correspondingly therewith, but with a certain phase shift and considerably flatter, the air temperature in the freezing compartment also rises. As a result thereof, the core temperature in the warmest package in the freezing compartment, represented by the dotted line, rises slowly.

As can be seen from the right half of the diagram according to FIG. 2, the core temperature rises distinctly above the set value which is strictly held during the normal control operation. This means that in this defrosting process the temperature of the stored frozen matter rises above the permissible temperature limit. Only after the normal control operation is resumed to the right of the vertical straight line "B" does the evaporator temperature which is represented in FIG. 2 by the solid line, drop steeply, whereupon subsequently, the air temperature also drops again. The core temperature, however, continues to rise for a while, as can be seen clearly from the right-hand section of the diagram, until it finally starts to drop again after a considerable time delay and then, after a long time, reaches the set value again.

In the diagram shown in FIG. 3, the end of the normal control operation is to the left of the time appearing as a vertical line "C." As already explained above, the timer 15 first switches the drive of the refrigeration unit to continuous operation by closing the switch 18, so that subsequently, the temperature at the evaporator drops considerably in accordance with the solid curve in FIG. 3. With corresponding delay and flattening-out, also the air temperature, represented by the dash-dotted line, and the core temperature in the warmest package, represented by the dotted line, drop subsequently. After continuously running for, say, three hours, the central vertical line "A" is reached. There, the switching of the timer 15 takes place; the unit is shut down and the defrosting heater 22 is switched on. Although the evaporator temperature starts from a lower level in this case, it proceeds upward approximately as in the diagram in FIG. 2, until at the time represented by the vertical straight line "B" the defrosting is finished. Also the air temperature rises during this defrosting process but remains distinctly lower even at its highest point than is the case with the air temperature in the diagram as per FIG. 2, because of the preceding continuous run. Likewise, the core temperature in the warmest package is still safely below the permissible temperature limit during the resuming control operation.

It can be seen from the diagram according to FIG. 3 that it is possible by means of the arrangement shown and described to equip a freezer with an automatic defrosting device without letting the stored frozen material get warmed up above the permissible temperature limit during the defrosting process. It is, of course, also possible to modify the arrangement described for a freezer with a hot-gas defrosting device. Provision must be made here by installing appropriate switching members that the drive 21 of the refrigerating unit continues to run during the defrosting process. Deviating from the embodiment example shown and described, it is, however, also possible without difficulty to initiate the defrosting of the evaporator in a freezer by hand. Provision must be made here for an appropriate delay between the closing of the switch 18 and the actuation of the double-throw switch 17. This delay can be varied in accordance with the special circumstances in the specific freezers. The important factor is that the temperature in the freezer is always lowered prior to the defrosting by a sufficiently long continuous run of the refrigerating unit so that during the subsequent defrosting process the temperature limit permissible for the stored frozen matter is not exceeded.

There are claimed:

1. Refrigerating apparatus for storing material at and below a permissible upper temperature below the freezing point, such as a refrigerator, freezer and the like with at least one refrigeration chamber, having heat exchanger disposed in the refrigeration chamber, an electrically operated refrigeration unit controlled by a thermostat in the refrigeration chamber which refrigeration unit when energized provides coolant to the heat exchanger to maintain a set temperature of desired coldness in the refrigeration chamber, means for defrosting the heat exchanger, a control device, such as a timer, including switching elements to initiate and terminate defrosting of the heat exchanger, the improvement comprising means for decontrolling the thermostat to prevent it from activating the refrigeration unit prior to every initial defrosting and switch-on means for automatically activating the refrigeration unit prior to every initial defrosting to effect a drop in temperature in the refrigeration chamber sufficient to prevent the stored material from exceeding its permissible upper temperature during subsequent defrosting.

2. Refrigerating apparatus for storing material at and below a permissible upper temperature below the freezing point, such as a refrigerator, freezer and the like with at least one refrigeration chamber, having heat exchanger disposed in the refrigeration chamber, an electrically operated refrigeration unit controlled by a thermostat in the refrigeration chamber which refrigeration unit when energized provides coolant to the heat exchanger to maintain a set temperature of desired coldness in the refrigeration chamber, means for defrosting the heat exchanger, a control device, such as a timer, including switching elements to initiate and terminate defrosting of the heat exchanger, the improvement comprising switch-on means for automatically activating the refrigeration unit prior to every initial defrosting to effect a drop in temperature in the refrigeration chamber sufficient to prevent the stored material from exceeding its permissible upper temperature during subsequent defrosting, wherein the control device is equipped with a drive with a double-throw switch, one of which in normal operation is connected in series with contacts of said thermostat to close a circuit with the refrigeration unit, another switch in the control device closes a circuit of the drive and the refrigeration unit via a by-pass line shorting the thermostat and activating the refrigeration unit to effect drop in temperature in the refrigeration chamber prior to defrosting, said double-throw switch after said prior cooling switching to open the circuit and deactivate the refrigeration unit and close a circuit with an element effecting defrosting of the heat exchanger, said double-throw switch after defrosting switching back to normal operation by closing said circuit in series with the contacts of said thermostat.

3. Method of storing material at and below a permissible upper temperature below the freezing point in a refrigeration chamber having a heat exchanger therein, maintaining a set temperature of desired coldness in the refrigeration chamber by a thermostat in the chamber which activates an electrically operated refrigeration unit to supply coolant to the heat exchanger, periodically deactivating the refrigeration unit and introducing heat into the refrigeration chamber to defrost the heat exchanger, and after defrosting returning to activating the refrigeration unit by control with the thermostat in the chamber, the improvement comprising immediately prior to initiating every defrosting, decontrolling the thermostat to prevent it from activating the refrigeration unit and automatically activating the refrigeration unit to effect a drop in temperature in the refrigeration chamber sufficient to prevent the stored material from exceeding its permissible upper temperature during subsequent defrosting.

* * * * *